(12) United States Patent
Hung et al.

(10) Patent No.: US 11,929,609 B2
(45) Date of Patent: Mar. 12, 2024

(54) SURGE PROTECTION CIRCUIT

(71) Applicant: Silego Technology Inc., Santa Clara, CA (US)

(72) Inventors: Der-Ju Hung, New Taipei (TW); Yuan Wen Hsiao, Hsinchu (TW)

(73) Assignee: Renesas Design Technology Inc., Santa Clara, CA (US)

( * ) Notice: Subject to any disclaimer, the term of this patent is extended or adjusted under 35 U.S.C. 154(b) by 0 days.

(21) Appl. No.: 17/736,306

(22) Filed: May 4, 2022

(65) Prior Publication Data

US 2023/0361557 A1  Nov. 9, 2023

(51) Int. Cl.
*H02H 9/02* (2006.01)

(52) U.S. Cl.
CPC ..................... *H02H 9/02* (2013.01)

(58) Field of Classification Search
CPC ............ H02H 9/04; H02H 9/046; H02H 9/02; H02H 9/041; H02H 9/043; H02H 9/00; H01L 27/0251; H01L 27/0266
USPC ..................... 361/56, 111
See application file for complete search history.

(56) References Cited

U.S. PATENT DOCUMENTS

| | | | | |
|---|---|---|---|---|
| 8,405,942 B2* | 3/2013 | Tailliet | ................ | H01L 27/0248 361/56 |
| 9,305,916 B1* | 4/2016 | Cai | ...................... | H01L 27/1211 |
| 2005/0237681 A1* | 10/2005 | Chen | ...................... | H02H 9/046 361/56 |
| 2019/0190256 A1* | 6/2019 | Agarwal | ................ | H02H 9/046 |

OTHER PUBLICATIONS

ST life.augmented, AN4275 Application note, IEC 61000-4-5 standard overview, DocID024389 Rev 1, Aug. 2013, pp. 1-11.
IEEE Power Electronics Society, Denver Chapter, "Introduction to Voltage Surge Immunity Testing," by Bryce Hesterman et al., Copyright Advanced Energy Industries, Inc., Sep. 18, 2007, www.denverpels.org, 67 pages.
"TVS Surge Rating: Power vs. Current," by Cameron Phillips, IT TechNotes, SLVAE53, Copyright Texas Instruments Incorporated, Dec. 2018, 3 pages.
"A 23 mΩ, 4.5 A nFET Integrated Power Switch with Surge Protection and Adjustable OVP in a 2.34 mm² WLCSP," Copyright Dialog Semiconductor, Datasheet SLG59H1313C, Revision 1.5, Feb. 18, 2021, pp. 1-30.

* cited by examiner

*Primary Examiner* — Danny Nguyen
(74) *Attorney, Agent, or Firm* — Salle Ackerman LLC; Stephen B. Ackerman

(57) ABSTRACT

A surge protection circuit is presented. The surge protection circuit includes an input port for receiving an input voltage; an energy release cell having a first terminal coupled to the input port, a second terminal coupled to ground, and a control terminal coupled to the input port via a first switch device and to the ground via a second switch device. The surge protection circuit is adapted to close the first switch device to enable a current to flow from the input port to ground through the release cell upon occurrence of a positive voltage surge and to close the second switch device to enable a current to flow from ground to the input port through the release cell upon occurrence of a negative voltage surge.

18 Claims, 19 Drawing Sheets

FIG. 1 – Prior Art

SURGE PROTECTION CIRCUIT

TECHNICAL FIELD

The present disclosure relates to a surge protection circuit. In particular, the present disclosure relates to a transient voltage suppressor cell.

BACKGROUND

Surge protection circuits may be used in various applications, including electronic devices which could be damaged due to transient voltages, including cell phones among others. Existing surge protection circuits have a limited level of protection in the region of ±100V. In addition, immunity levels for positive and negative surge cannot be adjusted separately and may require modifications of the circuit design to reach the desired surge immunity target.

SUMMARY

It is an object of the disclosure to address one or more of the above mentioned limitations.

According to a first aspect of the disclosure there is provided a surge protection circuit comprising an input port for receiving an input voltage; an energy release cell having a first terminal coupled to the input port, a second terminal coupled to ground, and a control terminal coupled to the input port via a first switch device and to the ground via a second switch device; the surge protection circuit being adapted to close the first switch device to enable a current to flow from the input port to ground through the release cell upon occurrence of a positive voltage surge and to close the second switch device to enable a current to flow from ground to the input port through the release cell upon occurrence of a negative voltage surge.

Optionally, wherein the positive voltage surge occurs when the input voltage rises with a rising slew rate greater than a rising slew rate threshold or when the input voltage rises above a positive voltage threshold for a particular rising slew rate; and wherein the negative voltage surge occurs when the input voltage decreases with a falling slew rate greater than a falling slew rate threshold or when the input voltage decreases below a negative voltage threshold for a particular falling slew rate.

Optionally, the surge protection circuit comprises a first surge cell adapted to provide a first signal to close the first switch device upon occurrence of the positive voltage surge; and a second surge cell adapted to provide a second signal to close the second switch device upon occurrence of the negative voltage surge.

Optionally, wherein the first switch device comprises a first switch coupled to a second switch.

Optionally, wherein the first switch and the second switch have a common source node.

Optionally, wherein the first switch device comprises a first Zener diode coupled to the common source node and to a gate terminal of the first and second switches.

Optionally, wherein the second switch device comprises a third switch coupled to a fourth switch.

Optionally, wherein the fourth switch has a control terminal coupled to ground via a second Zener diode.

Optionally, wherein the energy release cell comprises a fifth switch coupled to a sixth switch.

Optionally, wherein the fifth switch and the sixth switch are power switches.

Optionally, wherein the first surge cell comprises a first capacitor.

Optionally, wherein the second surge cell comprises a second capacitor.

Optionally, wherein the rising slew rate threshold and the positive voltage threshold are defined by the first capacitor and a size of the fifth switch.

Optionally, wherein the falling slew rate threshold and the negative voltage threshold are defined by the second capacitor and a size of the sixth switch.

Optionally, the surge protection circuit further comprises a biasing circuit coupled to the energy release cell, the biasing circuit being adapted to bias a substrate to the input voltage or to ground.

Optionally, the biasing circuit comprises a seventh switch coupled to an eighth switch; wherein the seventh switch has a control terminal coupled to ground and wherein the eighth switch has a control terminal coupled to the input port.

Optionally, wherein the seventh and eight switches have a common node coupled to the energy release cell.

According to a second aspect of the disclosure there is provided a device comprising a surge protection circuit according to the first aspect.

For instance the device may be a user device such as a mobile phone or a connector device such as a USB connector.

According to a third aspect of the disclosure there is provided a method of protecting against a surge, the method comprising
receiving an input voltage at an input port;
providing an energy release cell having a first terminal coupled to the input port, a second terminal coupled to ground, and a control terminal coupled to the input port via a first switch device and to the ground via a second switch device;
upon occurrence of a positive voltage surge, closing the first switch device to enable a current to flow from the input port to ground through the release cell; and
upon occurrence of a negative voltage surge, closing the second switch device to enable a current to flow from ground to the input port through the release cell.

Optionally, wherein the positive voltage surge occurs when the input voltage rises with a rising slew rate greater than a rising slew rate threshold or when the input voltage rises above a positive voltage threshold for a particular rising slew rate; and wherein the negative voltage surge occurs when the input voltage decreases with a falling slew rate greater than a falling slew rate threshold or when the input voltage decreases below a negative voltage threshold for a particular falling slew rate.

The options described with respect to the first aspect of the disclosure are also common to the second and third aspects of the disclosure.

BRIEF DESCRIPTION OF THE DRAWINGS

The disclosure is described in further detail below by way of example and with reference to the accompanying drawings, in which.

DETAILED DESCRIPTION

Figure 1:
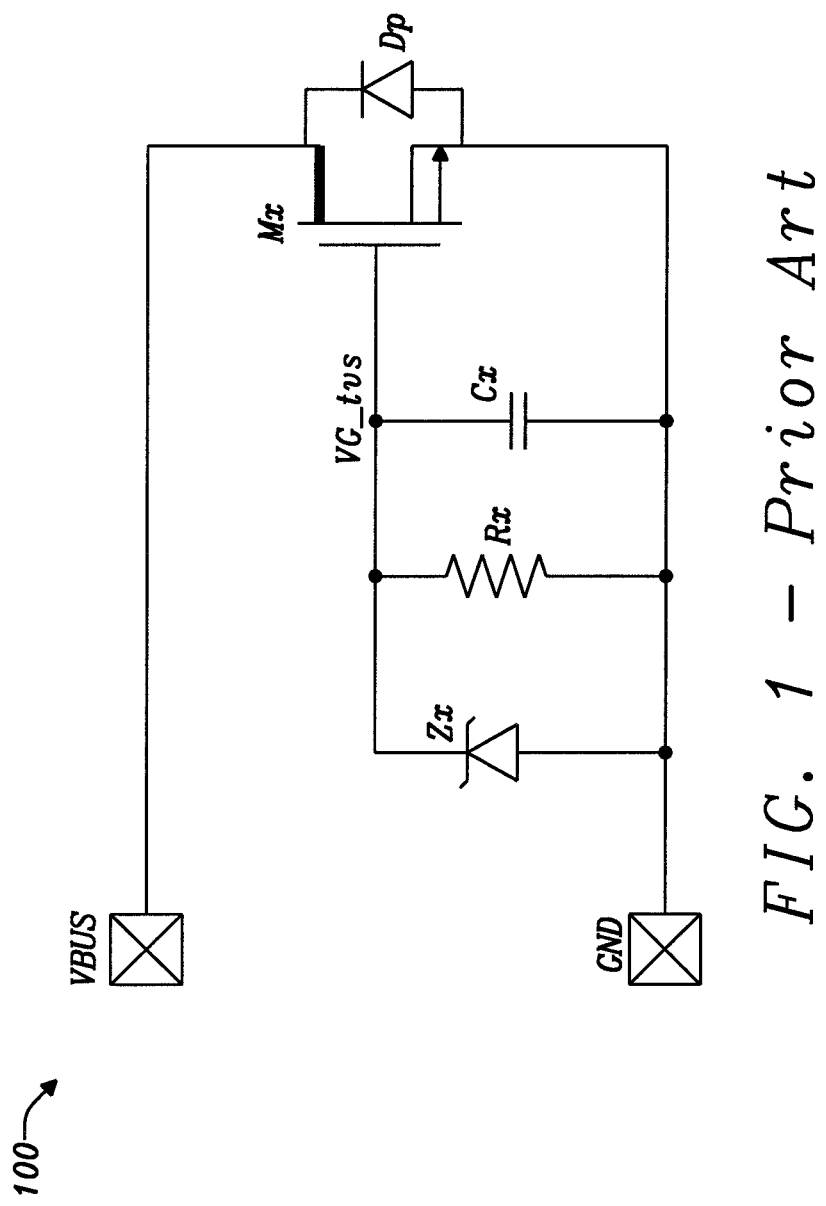
FIG. 1 is a diagram of a Transient Voltage Suppressor cell (TVS) according to the prior art.

FIG. 1 illustrates a Transient Voltage Suppressor cell (TVS) as described in data sheet SLG59H1313C, Dialog Semiconductor. The cell 100 has a power transistor Mx provided between an input port for receiving a voltage VBUS and a ground port. The power transistor Mx has a drain terminal connected to the input port, a source terminal connected to the ground port and a gate terminal connected to the ground port via a Zener diode Zx. A resistance Rx and a capacitor Cx are provided in parallel with the Zener diode.

The resistance Rx and the capacitor Cx may be tuned by changing the layout of the metal layers to achieve a surge immunity level of ±100V with an Absolute Maximum Ratings (AMR) of −0.3V~28V. Changing the layout of the metal layers is a time consuming process.

For positive surge, the surge is released using the power transistor Mx. For negative surge, the surge is released using both Mx and the parasitic body diode Dp. Positive and negative protection capability have different coupling behavior and are influenced by changing Rx, Cx and Mx simultaneously.

The circuit 100 cannot adjust positive and negative surge immunity level separately and has a surge immunity capability limited to ±100V. Higher protection level cannot be achieved by tuning the metal layers alone and requires a new design to reach the surge immunity target. The circuit also suffers from large leakage if VBUS is supplied as negative voltage due to the body diode of the power switch Mx.

Figure 2:
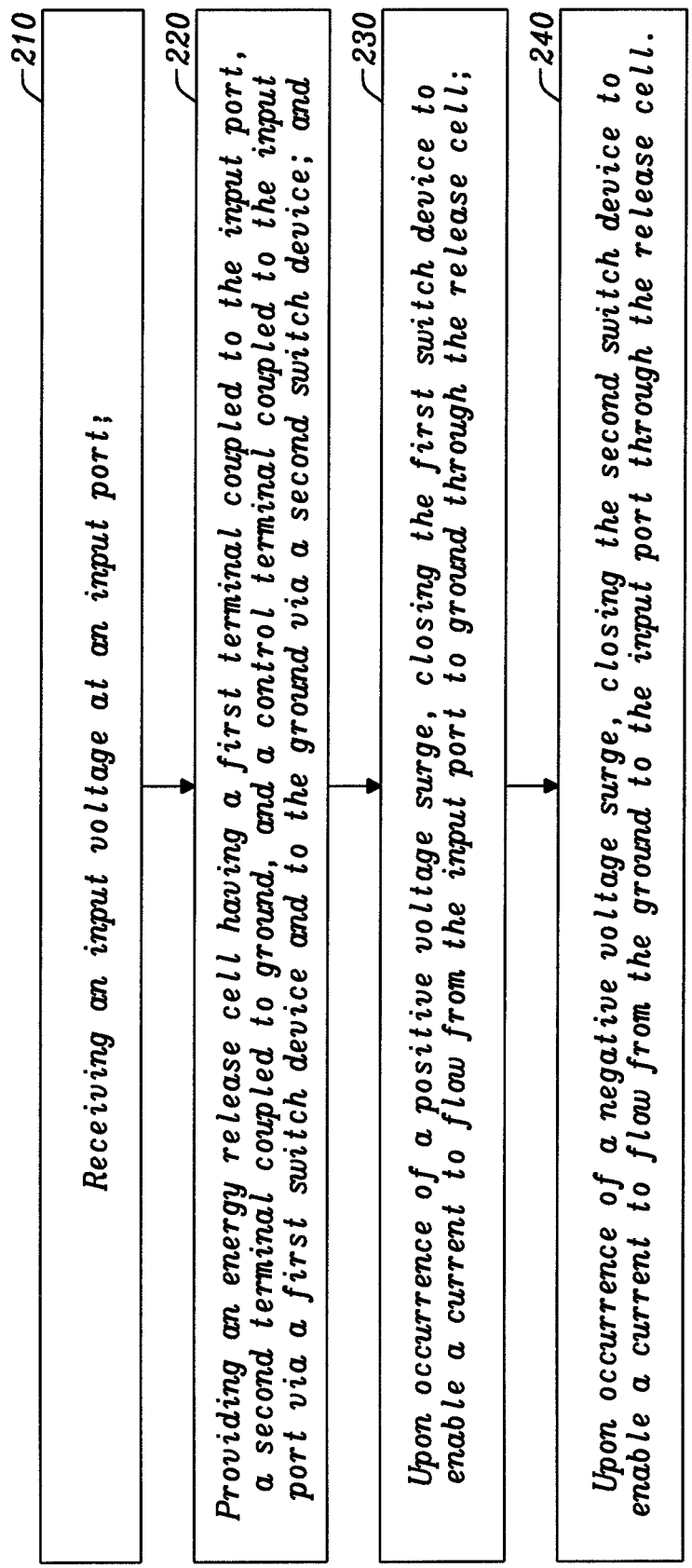
FIG. 2 is a flow chart of a method for protecting against a surge.

FIG. 2 is a flow chart of a method for protecting against a surge.

At step 210, an input voltage is received at an input port.

At step 220, an energy release cell is provided. The energy release cell has a first terminal coupled to the input port, a second terminal coupled to ground, and a control terminal coupled to the input port via a first switch device and to the ground via a second switch device.

At step 230, upon occurrence of a positive surge, the first switch device is closed to enable a current to flow from the input port to ground through the energy release cell.

For instance a positive voltage surge or positive surge condition, may occur when the input voltage rises with a rate of change (rising slew rate) greater than a rising slew rate threshold, or when the input voltage rises above a positive voltage threshold for a particular rising slew rate.

A step 240, upon occurrence of a negative surge, the second switch device is closed to enable a current to flow from ground to the input port through the release cell.

For instance a negative voltage surge or negative surge condition, may occur when the input voltage decreases with a rate of change (falling slew rate) greater (in absolute value) than a falling slew rate threshold or when the input voltage decreases below a negative voltage threshold for a particular falling slew rate.

Figure 3:
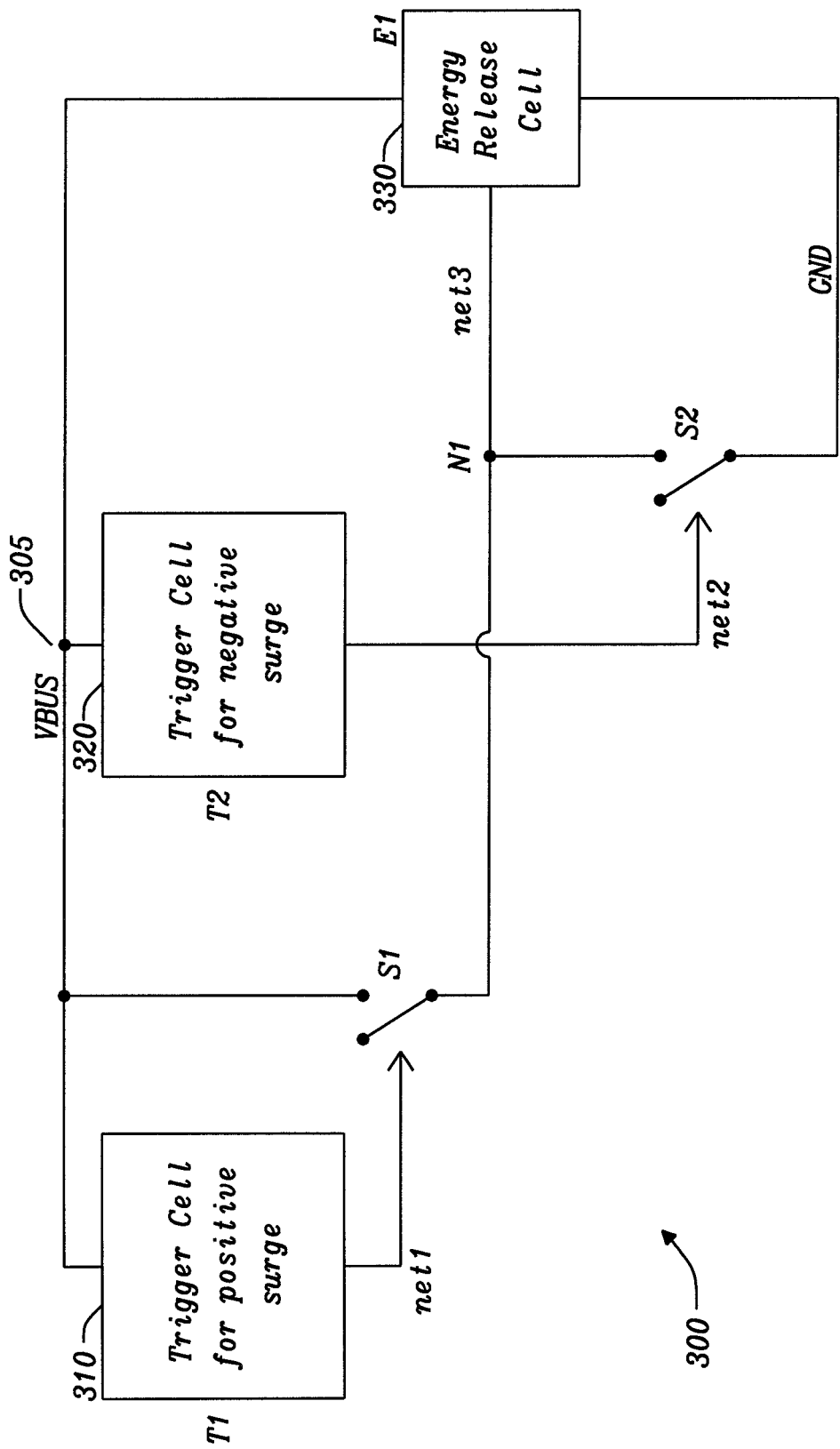
FIG. 3 is a diagram of a surge protection circuit according to the disclosure.

FIG. 3 is a diagram of a surge protection circuit according to the disclosure.

The surge protecting circuit 300 has an input port 305 for receiving an input voltage VBUS, a ground port, two switch devices S1 and S2, two surge cells T1 310, T2 320 and an energy release cell E1 330.

The first surge cell T1, 310 also referred to as trigger cell for positive surge, is adapted to provide a first signal (net 1) to close the first switch device S1 upon occurrence of a positive voltage surge. As mentioned above a positive voltage surge may occur when the input voltage rises with rate of change greater than a rising rate threshold. For example if the input voltage rises with a rate greater than 50V/μs. Alternatively a positive voltage may occur when the input voltage rises above a positive voltage threshold for a particular rising rate. For example if the input voltage rises above 20V with a rising rate of 10V/μs.

The second surge cell T2, 320 also referred to as trigger cell for negative surge is adapted to provide a second signal (net 2) to close the second switch device S2 upon occurrence of a negative voltage surge. As mentioned above a negative voltage surge may occur when the input voltage decreases with a rate of change greater than a falling rate threshold or when the input voltage decreases below a negative voltage threshold for a particular falling rate.

The first surge cell T1 has a first terminal coupled to the input port 305 and a second terminal for providing the signal net1 to control the first switch device S1. The second surge cell T2 has a first terminal coupled to the input port 305 and a second terminal for providing the signal net2 to control the second switch device S2. The energy cell E1 has a first terminal coupled to the input port 305, a second terminal coupled to ground, and a third (control) terminal coupled to S1 and S2 at node N1.

Upon occurrence of a positive surge, the circuit 300 closes the first switch device S1 to enable a current to flow from the input port 305 to ground through the energy release cell E1 330.

Upon occurrence of a negative surge, the circuit 300 closes the second switch device S2 to enable a current to flow from ground to the input port 305 through the energy release cell 330.

Figure 4A:
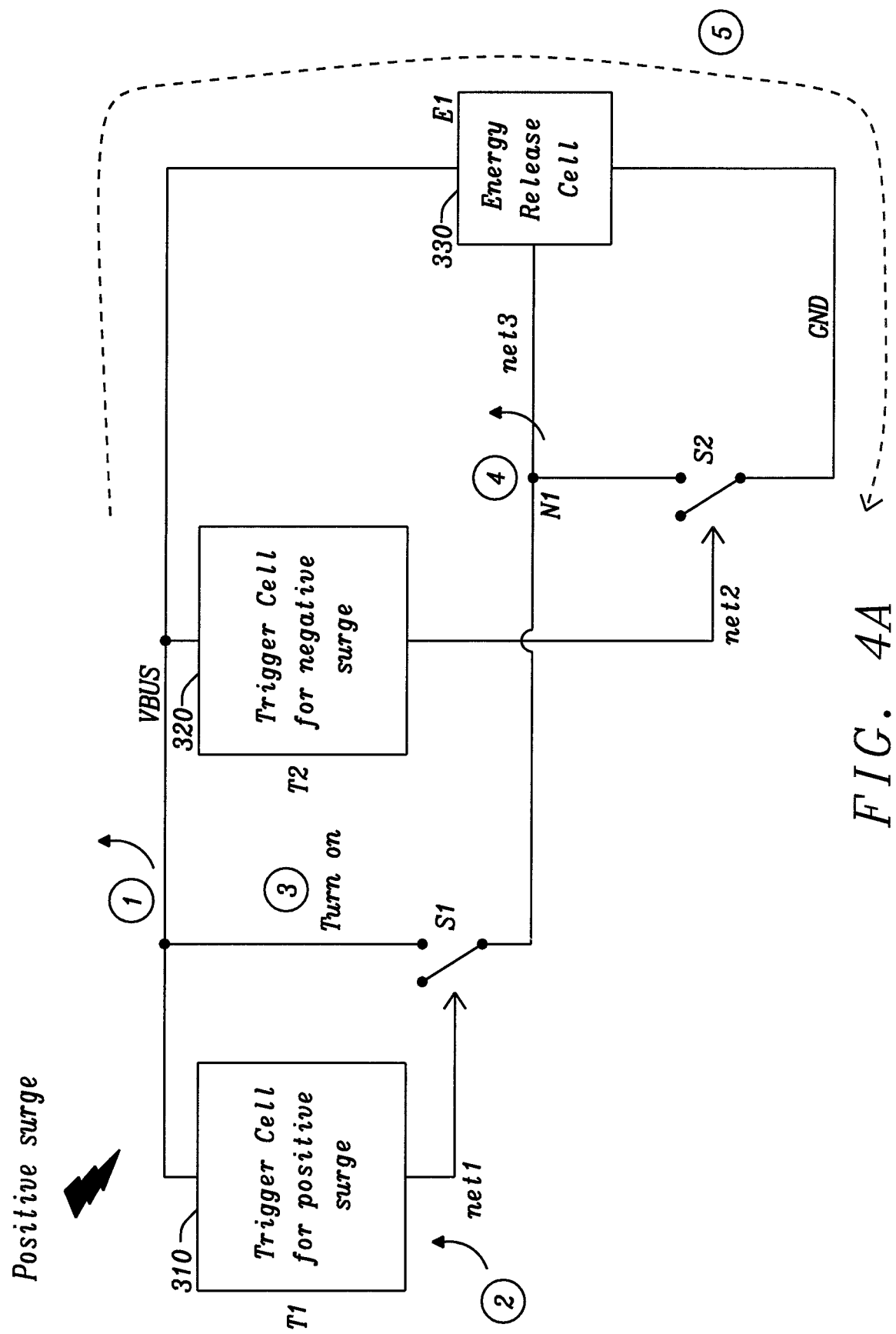
FIG. 4A is a diagram illustrating the operation of the circuit of FIG. 3 upon occurrence of a positive surge.

FIG. 4A illustrates the operation of the circuit 300 upon occurrence of a positive surge. The signal Net 1 provided by the first cell T1 310 goes high and the switch device S1 turns ON (closed). The signal Net 3 at node N1 goes high, and the energy cell E1 330 turns on to release surge energy from VBUS to ground.

Figure 4B:
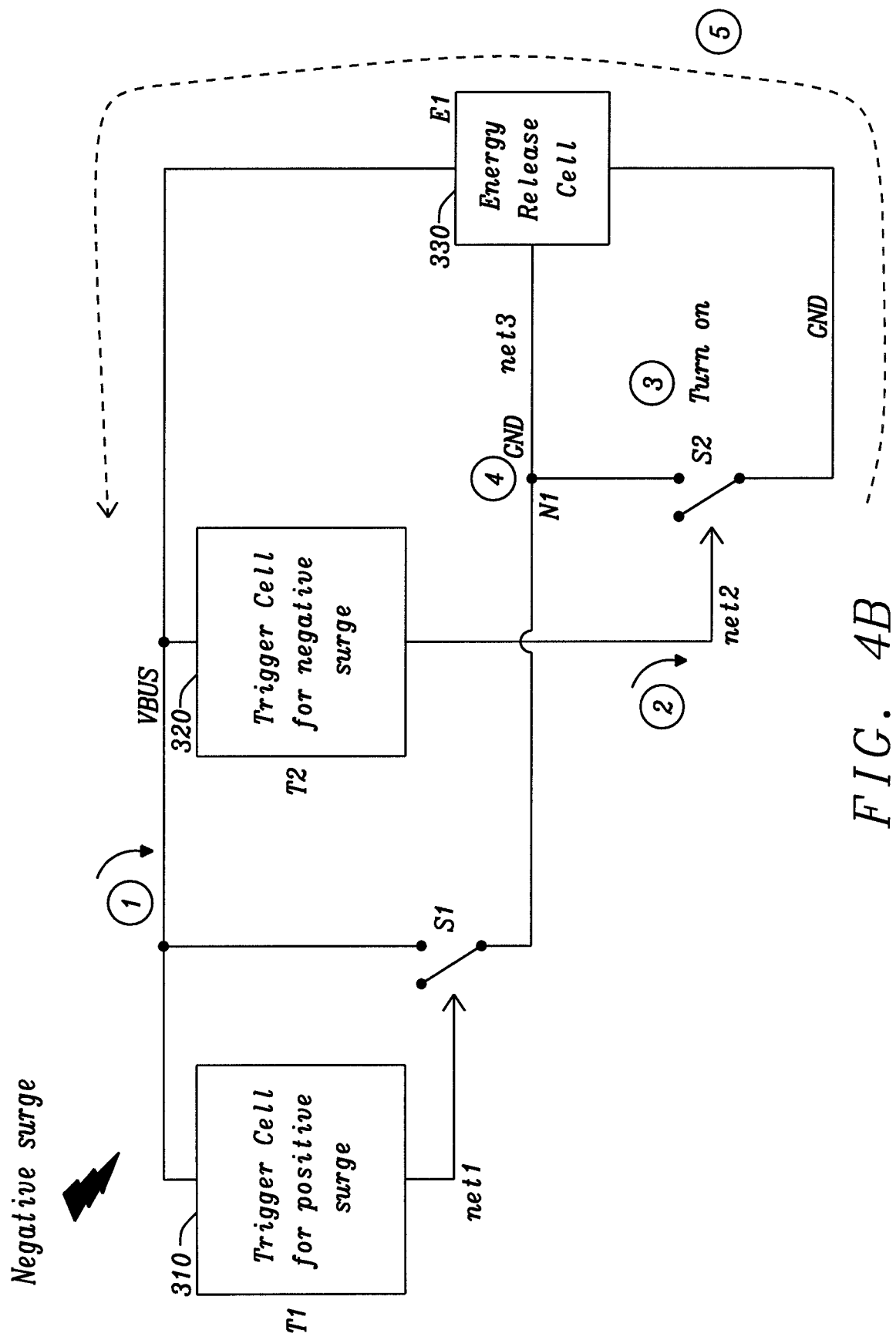
FIG. 4B is a diagram illustrating the operation of the circuit of FIG. 3 upon occurrence of a negative surge.

FIG. 4B illustrates the operation of the circuit 300 upon occurrence of a negative surge. The signal Net 2 provided by the second cell T2 320 goes low and the switch device S2 turns ON (closed). The signal Net 3 at node N1 goes low (to ground), and the energy cell E1 330 turns on to release surge energy from ground to VBUS.

The circuit 300 can therefore achieve adjustable positive and negative surge immunity separately. The level of positive and negative surge immunity may be adjusted by changing specific parameters of the circuits. In addition, the energy release cell E1 may be adapted to block the DC current as VBUS is positive or negative. This may be achieved using a substrate biasing circuit such that when VBUS is positive, the signal net3 decreases to ground without DC current through E1 and when VBUS is negative, the signal net3 decreases to VBUS or follows VBUS without DC current through E1.

Figure 5:
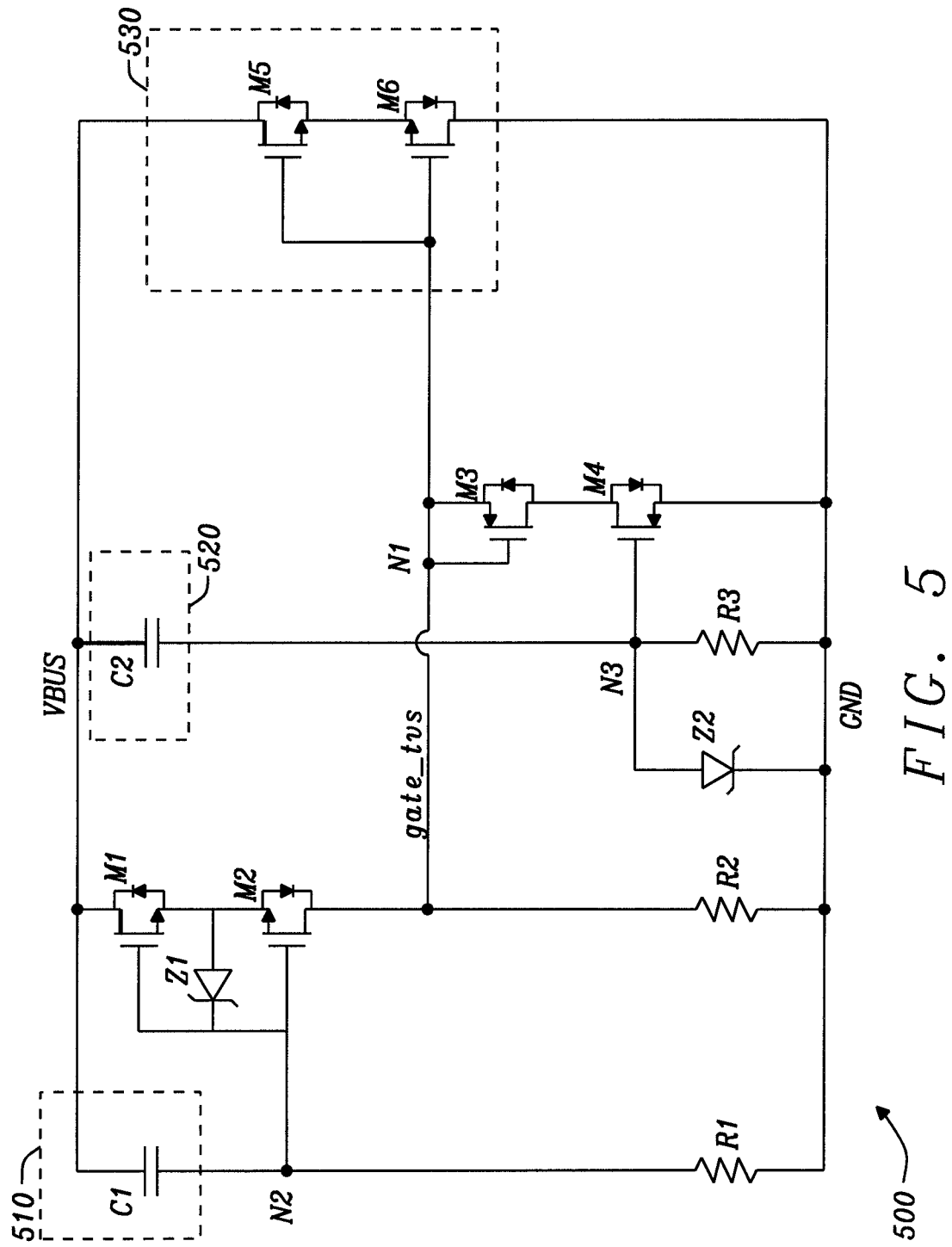
FIG. 5 is an exemplary embodiment of the surge protection circuit of FIG. 3.

FIG. 5 is an exemplary embodiment of the surge protection circuit of FIG. 3. In this example the circuit 500 has a first cell 510 formed of a capacitor C1, a second cell 520 formed of a capacitor C2, and an energy cell 530 formed of two transistors M5 and M6. The circuit also includes a first switch device formed of transistors M1 and M2, coupled to a Zener diode Z1, and a second switch device formed of transistors M3 and M4 coupled to a Zener diode Z2.

The transistor M1 has a drain terminal coupled to the input port and a source terminal coupled to the source terminal of M2 at a common source node. The gate terminals of M1 and M2 are coupled at node N2. The Zener diode Z1 is provided between the source terminals and N2.

The transistor M3 has a source terminal coupled to node N1 and a drain terminal coupled to the drain terminal of M4. The gate terminal of M3 is coupled to node N1 and the gate terminal of M4 is coupled to ground via the Zener diode Z2.

The transistor M5 has a drain terminal coupled to the input port and a source terminal coupled to the source terminal of M6. The gate terminals of M5 and M6 are coupled at node N1.

In addition, three resistances R1, R2 and R3 are provided. The resistance R1 couples C1 to ground, the resistance R2 couples M2 to ground, and the resistance R3 couples C2 to ground. The resistances R1, R2 and R3 can provide a pull-low path to disable the surge cell so that the surge cell is off at an initial state when there is no surge. The Zener diodes Z1 and Z2 are provided to protect the gate-source oxide of the switches M1, M2 and M4 by clamping the gate to source voltage; for instance VGS<6V.

The switches M1 and M5 may be NMOS high voltage transistors for instance with a voltage rating of 24V. Alternatively, the switches M1 and M5 may be NMOS low voltage transistors for instance with a voltage rating of 5V. The switches M2 and M6 may be NMOS low voltage transistors for instance with a voltage rating of 5V. The switches M3 and M4 may be PMOS low voltage transistors for instance with a voltage rating of 5V.

Figure 6A:
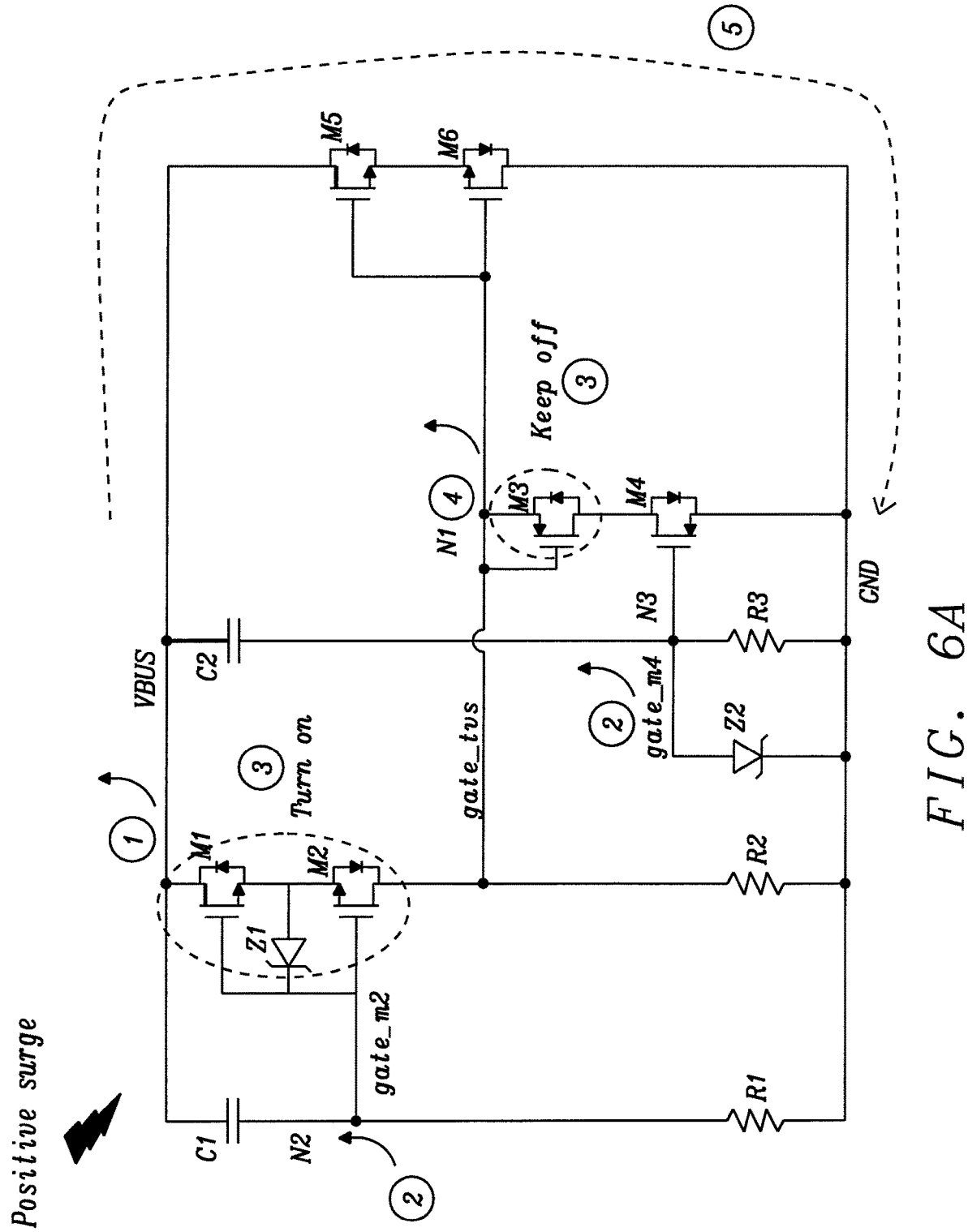
FIG. 6A is a diagram illustrating the operation of the circuit of FIG. 5 upon occurrence of a positive surge.

FIG. 6A illustrates the operation of the circuit 500 upon occurrence of a positive surge. The rising rate threshold and the positive voltage threshold are defined by the first capacitor C1.

The VBUS voltage>GND voltage (See point (1)). The gate voltage gate_m2 at node N2 goes high through C1. This voltage is clamped by the breakdown Zener diode Z1.

The voltage at the M1/M2 common source node is defined by gate_m2 and Z1 such that the gate to source voltages of M1 and M2 are equal to the voltage across the breakdown diode Z1: $Vgs(M1)=Vgs(M2)=Vbd(Z1)$. In an exemplary numerical example the breakdown voltage $Vbd(Z1){\sim}5.8V$. The gate voltage gate_m4 at node N3 goes high through C2. This voltage is clamped by the forward biased Zener diode Z2 (See point (2)).

The transistors M1 and M2 turn on while M3 is off as $Vgs(M3)=0V$. The switch M4 remains off (open) as Vgs(M4) is too low to turn M4 on. In a numerical example $Vgs(M4)=-Vf(Z2)$ $({\sim}{-}0.7V)$ with Vf being the forward diode voltage (See point (3)).

The gate voltage gate_tvs at node N1 rises (See point (4)). The transistors M5 and M6 turn on to release surge energy from VBUS to ground (See point (5)). The level of positive surge protection can be adjusted by selecting the size and voltage rating of the switch M5. The greater the size/voltage rating of M5, the greater the level of positive surge protection.

The sensitivity of the positive surge cell T1 510 can be adjusted by selecting an appropriate capacitance/size for the capacitor C1. The greater the capacitance/size, the greater the sensitivity. For a relatively small C1 (small capacitance) the positive surge cell requires the rate of change of the input voltage (slew rate) to be relatively large in order to turn on. By increasing the capacitance of C1, the positive surge cell turns on for a relatively smaller rate of change of the input voltage.

Figure 6B:
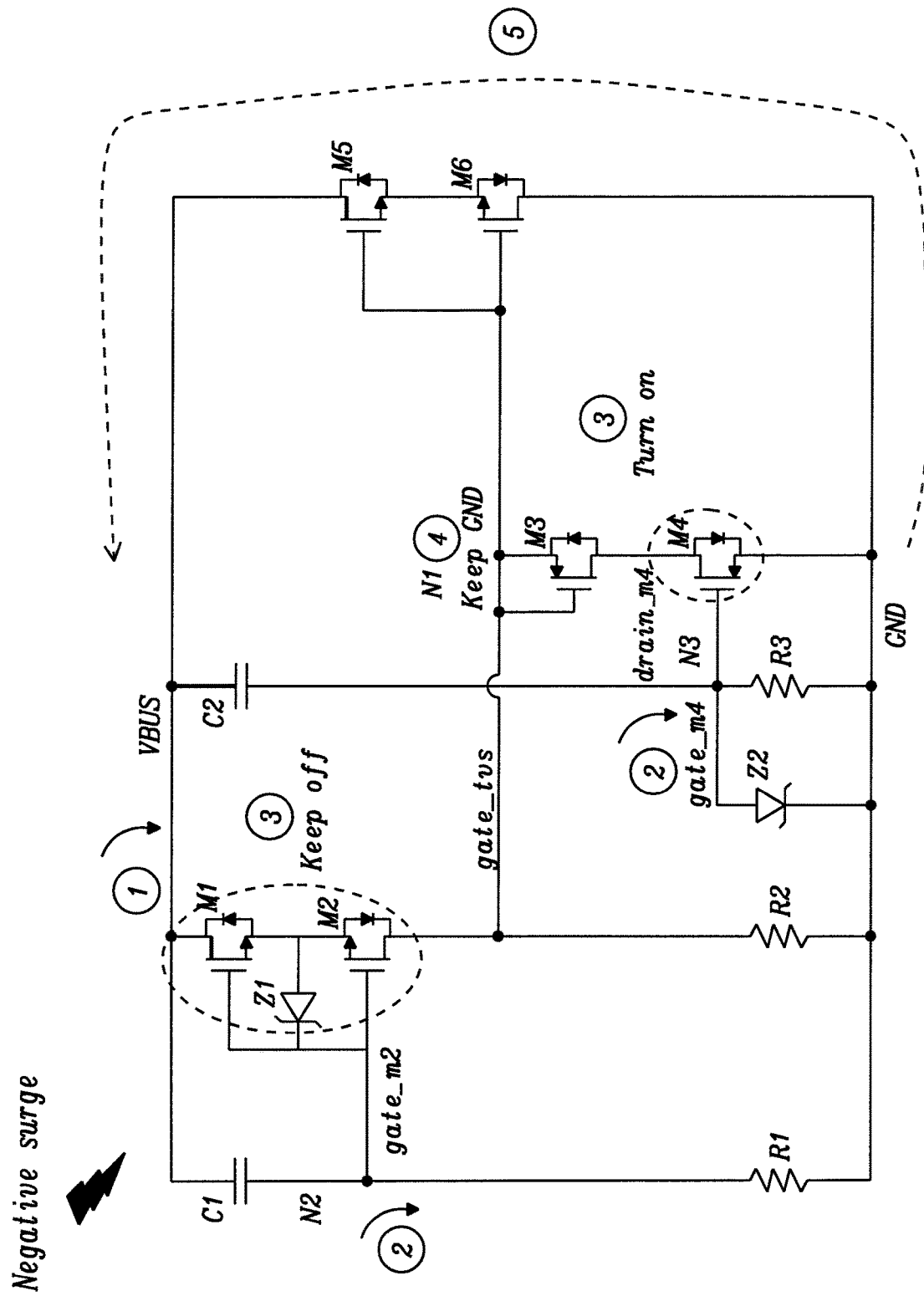
FIG. 6B is a diagram illustrating the operation of the circuit of FIG. 5 upon occurrence of a negative surge.

FIG. 6B illustrates the operation of the circuit 500 upon occurrence of a negative surge. The falling rate threshold and the negative voltage threshold are defined by the second capacitor C2.

The VBUS voltage<GND voltage (See point (1)). The gate voltage gate_m2 at node N2 goes negative through C1. This voltage is clamped by the forward biased Zener diode Z1. The gate voltage gate_m4 at node N3 goes low through C2. This voltage is clamped by the breakdown Zener diode Z2 (See point (2)).

The voltage at the M1/M2 common source node is defined by gate_m2 and Z1 such that the gate to source voltages of M1 and M2 are equal the voltage across the forward biased diode Z1: $Vgs(M1)=Vgs(M2)=-Vf(Z1)$. In an exemplary numerical example $-Vf(Z1){\sim}{-}0.7V$. The transistors M1 and M2 turn off (open). The gate to source voltage of M4 Vgs(M4) increases above the transistor threshold, for instance >5V via coupling through C2 to turn M4 on fully and force the drain terminal of M4 to ground (See point (3)).

The gate voltage gate_tvs at node N1 is between ground and $-Vd(M3)$ $({\sim}{-}0.7V)$ through M3 parasitic diode, however the resistor R2 keeps gate_tvs to ground (See point (4)).

The transistors M5 and M6 turn on to release surge energy from GND to VBUS (See point (5)).

The Zener diodes Z1 and Z2 can be selected to absorb a high overvoltage in a short time so as not to apply excessive voltage to other semiconductor devices. For instance, the Zener diode Z1 protects the gate-source terminals of the transistors M1 and M2 from excessive voltage. The Zener diodes Z1 and Z2 also protect supply or signal lines from transient surge events.

The level of negative surge protection can be adjusted by selecting the size and voltage rating of the switch M6. The greater the size/voltage rating of M6, the greater the level of negative surge protection.

The sensitivity of the negative surge cell T2 520 can be adjusted by selecting an appropriate capacitance/size for the capacitor C2. The greater the capacitance/size, the greater the sensitivity. For a relatively small C2 (small capacitance) the negative surge cell requires the rate of change of the input voltage (slew rate) to be relatively large in order to turn on. By increasing the capacitance of C2, the negative surge cell turns on for a relatively smaller rate of change of the input voltage.

Figure 7:
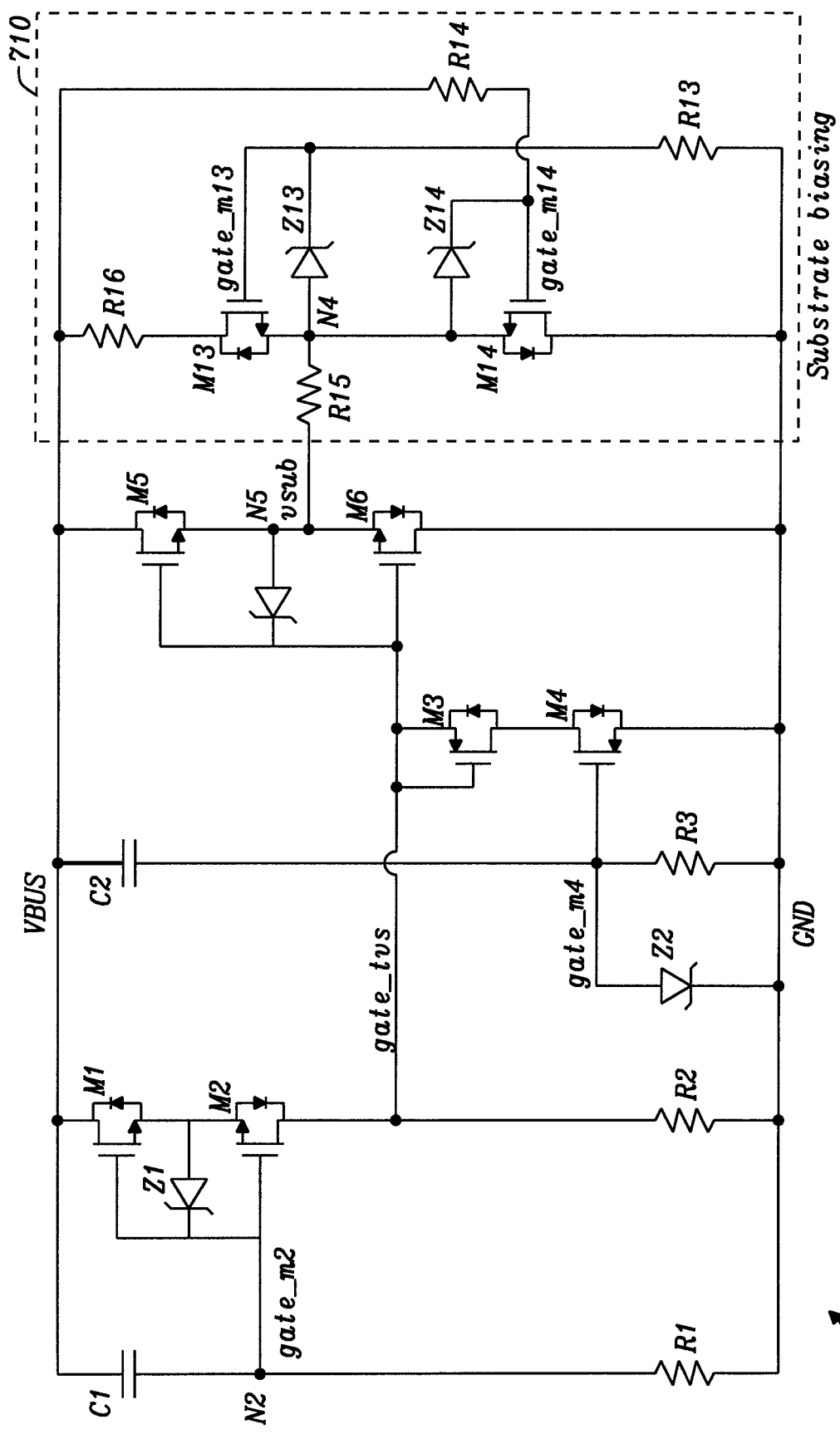
FIG. 7 is a surge protection circuit provided with substrate biasing.

FIG. 7 is a surge protection circuit provided with substrate biasing functionality. The circuit 700 is similar to the protecting circuit 500 of FIG. 5, however in this case a substrate biasing circuit 710 is added to permit operation with VBUS AMR (Absolute Maximum Rating) between about −6V (DC) and about +28V (DC) without triggering surge protection, hence without large currents flowing through the switches M5 and M6. In this example the circuit substrate can be biased to the lower of VBUS and Ground.

The substrate biasing circuit 710 includes two transistors M13 and M14, four resistance R13, R14, R15, R16 and two Zener diodes Z13, Z14. The resistances R15 and R16 provide a current limit protection to avoid a large current to be injected into the substrate biasing circuit 710.

The transistors M13 and M14 are coupled such that the source terminal of M13 is connected to the source terminal of M14 at node N4. The drain terminal of M13 is coupled to the drain terminal of M5 via R16 and the drain terminal of M14 is coupled to ground. The gate terminal of M13 is coupled to ground via R13 and to node N4 via Z13. The gate terminal of M14 is coupled to the drain terminal of M5 via R14 and to node N4 via Z14. The node N4 is coupled to the common source node N5 of transistors M5 and M6 via R15. A substrate voltage Vsub is applied at node N5.

The substrate biasing circuit 710 permits the substrate voltage Vsub to follow VBUS as VBUS decreases below 0V. For example, if VBUS=−6V (DC) and GND=0V, M13 turns on and Vsub becomes −6V (In this example M13 is implemented as NMOS transistor. The voltage gate_m13 keeps GND via R13. As VBUS goes DCnegative, M13 turns on and vsub can follow VBUS. The node N2 is connected to ground via R1 and the voltage at node N2 V(N2)=0 V. The breakdown voltage of Z1 Vbd (Z1) may be about 5.8V and the switches M1 and M2 turn on as Vgs(M1)=Vgs(M2)=Vbd(Z1) when VBUS=−6V. Then, gate_tvs becomes −6V. Therefore, Vgs(M6)=0V and M6 is off. The switch M5 is also off as VBUS goes DC negative. This prevents the occurrence of a high leakage current through M5 and M6 when VBUS(DC) is negative.

Therefore, the chip substrate (same as the circuit substrate) can be biased to the lower one of VBUS and ground. This ensures that the chip/circuit's substrate voltage is at the most negative potential and can eliminate or greatly reduce parasitic device current paths which may be leaky and potentially damage the chip when VBUS becomes negative. For instance, if VBUS=−6V and Vsub=0V, a leakage current may flow through M5 body diode to VBUS from substrate.

As VBUS becomes positive (for instance >1V), M14 turns on as gate_m14 is pulled high by R14 and Vsub is biased to GND. The gate-to-source voltage of M6 Vgs(M6)=0V and M6 is turned off. The gate_tvs signal is biased to 0V by R2 and M5 is off with Vgs(M5)=0. This design permits the chip to operate normally as VBUS becomes positive with VBUS AMR of −6V (DC)~+28V (DC).

The International Electrotechnical Commission's IEC 61000-4-5 is the international standard on surge immunity. According to this standard a generator can be used to model a surge. An overview of the standard can be found in STMicroelectronics "IEC 61000-4-5 standard overview", AN4275 datasheet, Application note, August 2013.

Figure 8A:
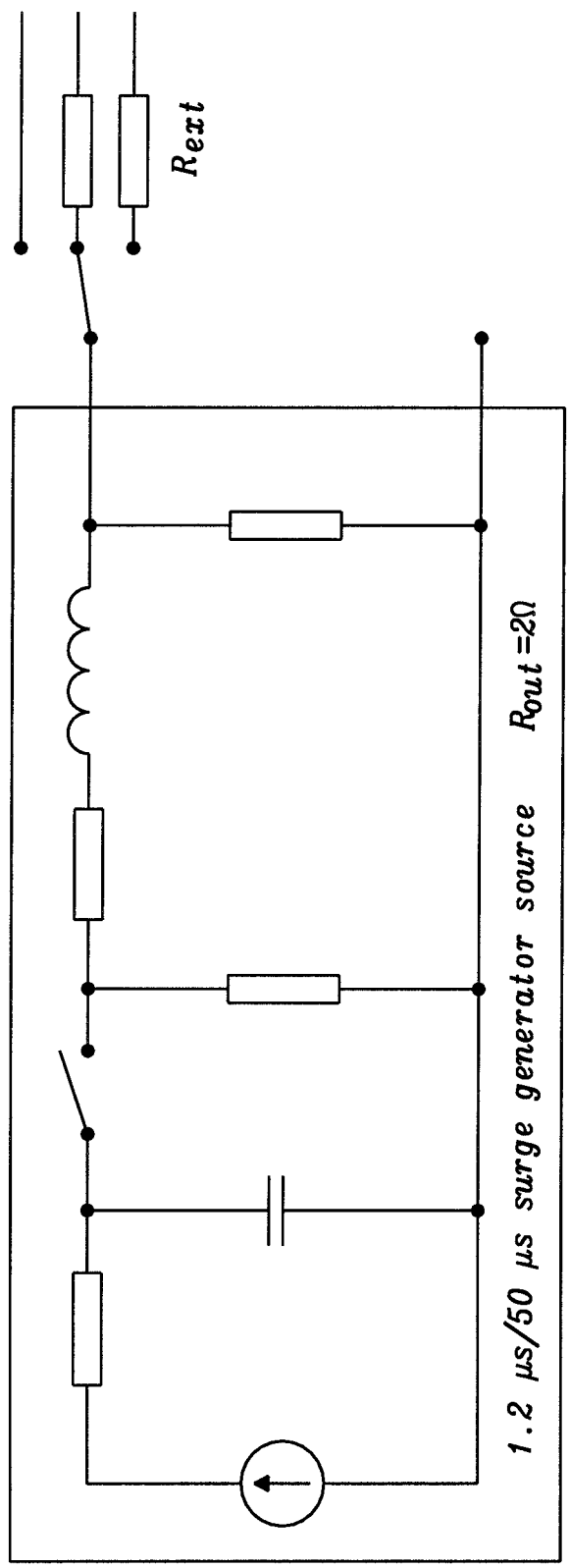
FIG. 8A is a diagram of a surge generator according to the IEC 61000-4-5 standard.

FIG. 8A is a diagram of a surge generator according to IEC 61000-4-5 standard. The surge definition in IEC 61000-4-5 is to meet the specification of 1.2 μs/50 μs surge duration. The output impedance Rout is 2Ω, and the ratio of the open circuit's peak voltage to the short circuit's peak current is the generator's output impedance of 2Ω.

The equations of open-circuit surge voltage and short-circuit surge current were reported in Douglas E. Powell and Bryce Hesterman, "Introduction to Voltage Surge Immunity Testing", IEEE Power Electronics Society Denver Chapter Meeting, September 2007.

For an open circuit waveform: $V(t) = A \cdot V_p \cdot (1-e^{-t/\tau_1}) \cdot e^{-t/\tau_2}$ (1)

$\tau_1 = 0.4074$ us
$\tau_2 = 68.22$ us
A=1.037
$V_p$: Voltage peak

For a short circuit waveform: $I(t) = A \cdot I_p \cdot t^k \cdot e^{-t/\tau}$ (2)

$\tau = 3.977$ us
k=2.93
A=0.1405
$I_p$: Current peak

The parameters of the surge generator model can be derived from the equations (1) and (2) above.

Figure 8B:
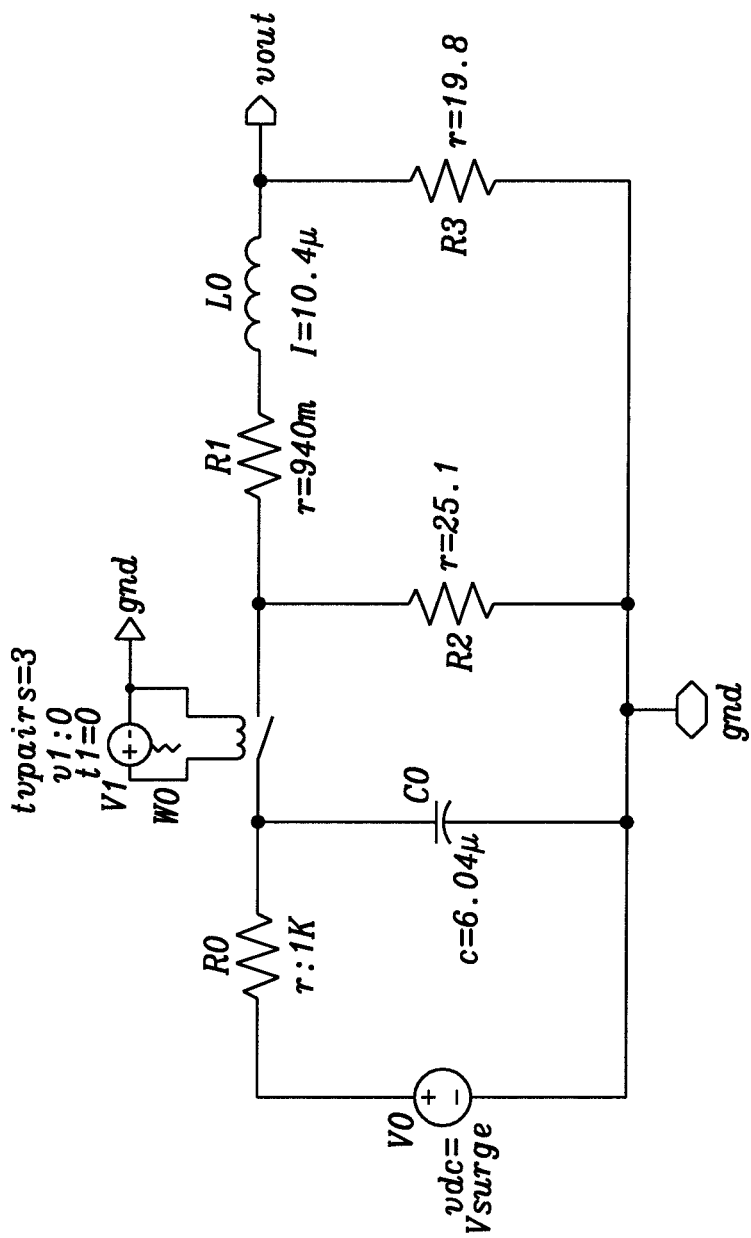
FIG. 8B is a schematic diagram of the surge generator model for the circuit of the disclosure.

FIG. 8B is a schematic diagram of the surge generator model with the derived parameters.

Figure 9A:
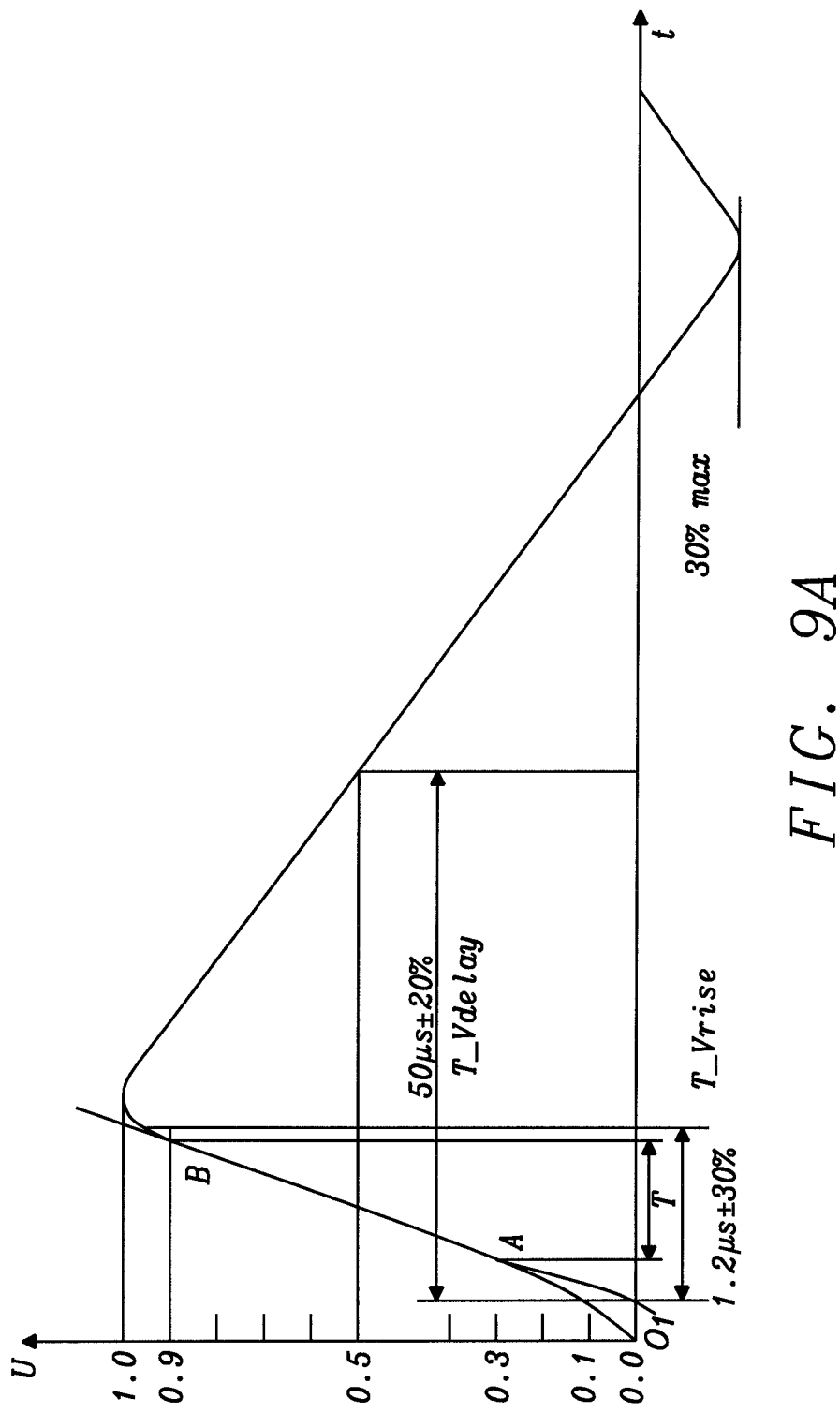
FIG. 9A is the open circuit voltage waveform as defined in the IEC 61000-4-5 standard.
Figure 9B:
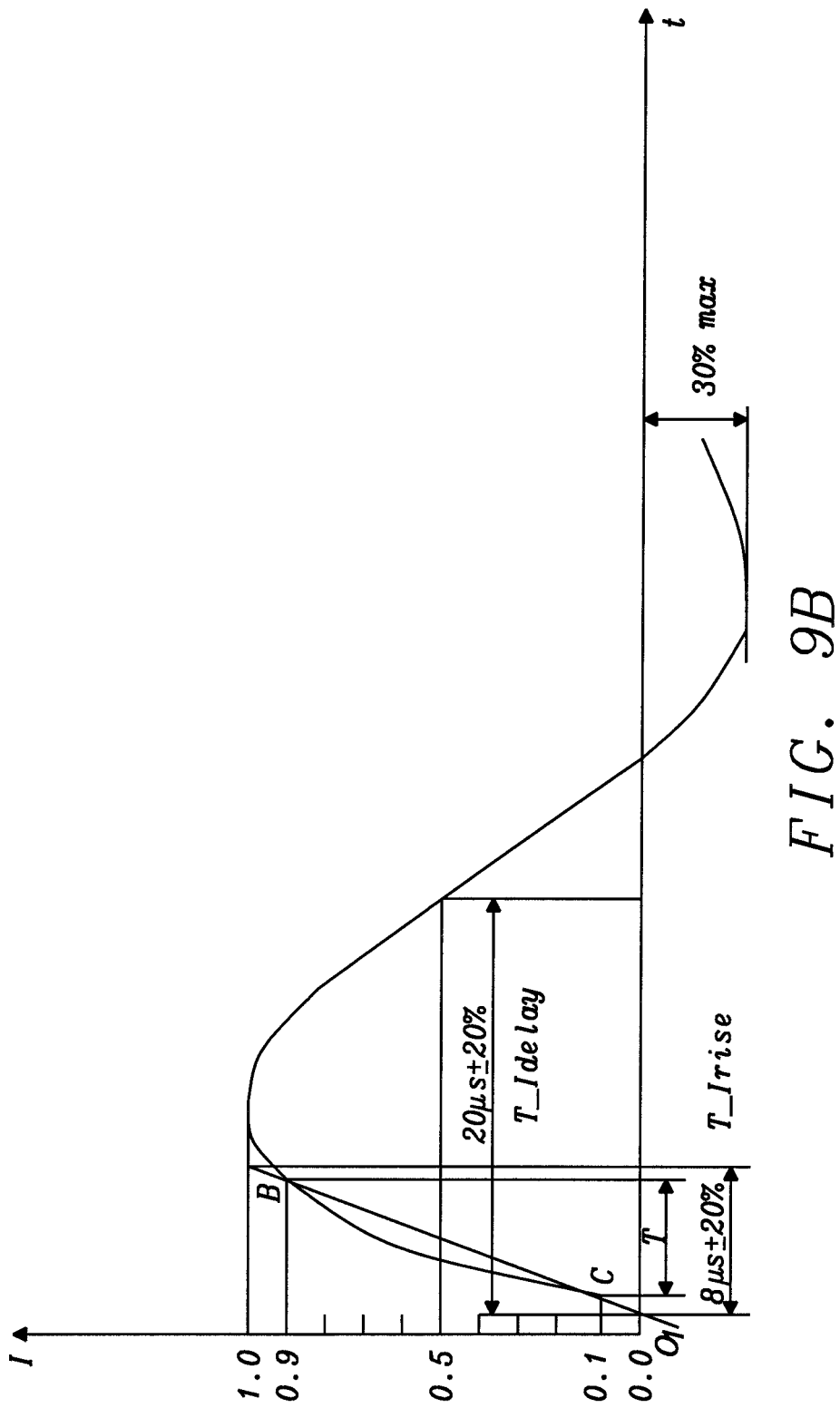
FIG. 9B is the short circuit current waveform as defined in the IEC 61000-4-5 standard.

FIGS. 9A and 9B show the open circuit voltage waveform and the short circuit current waveform as defined in the IEC 61000-4-5 standard, respectively.

Figure 10A:
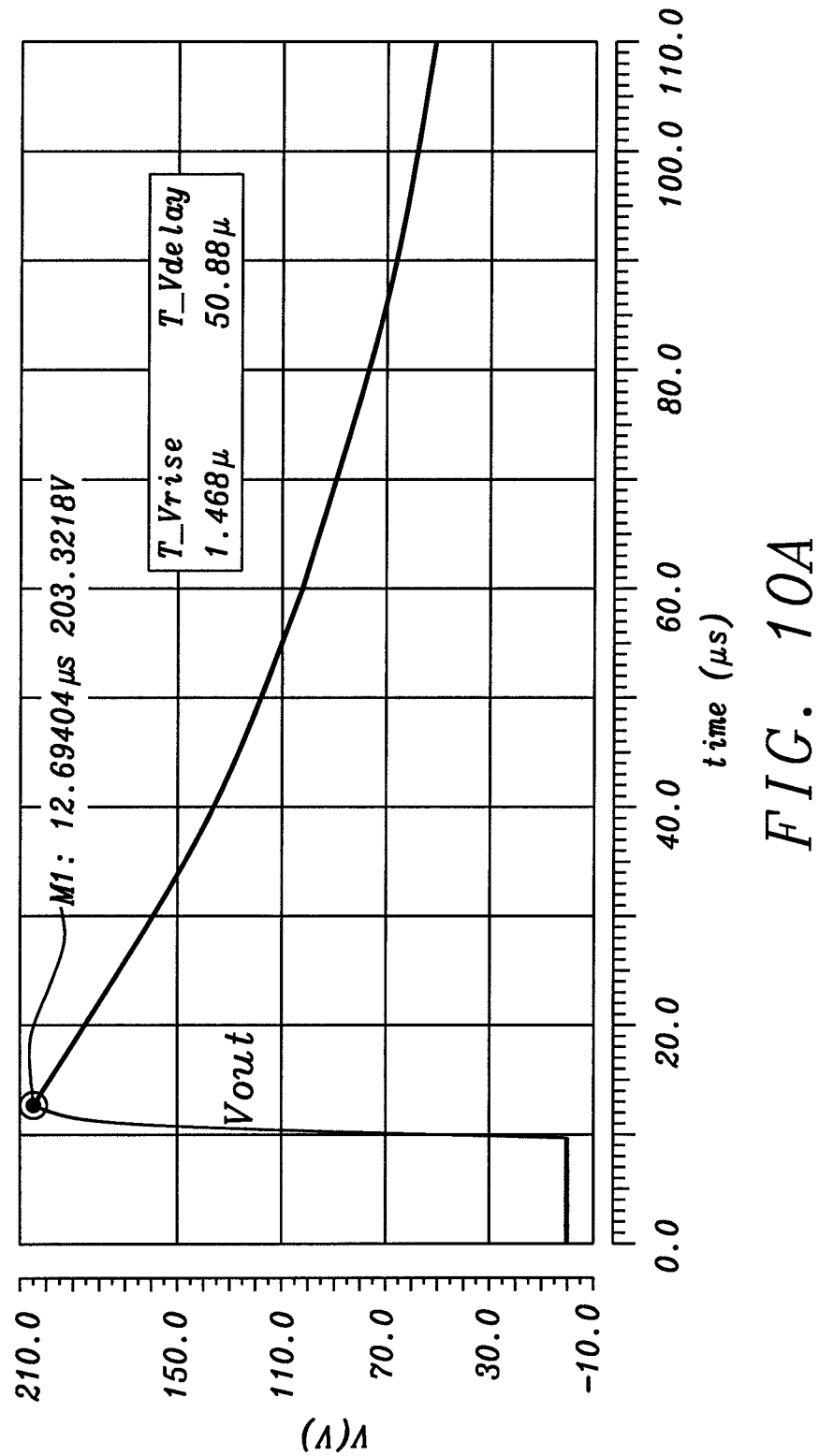
FIG. 10A is the simulation of the open circuit voltage waveform obtained from the model of FIG. 8B.
Figure 10B:
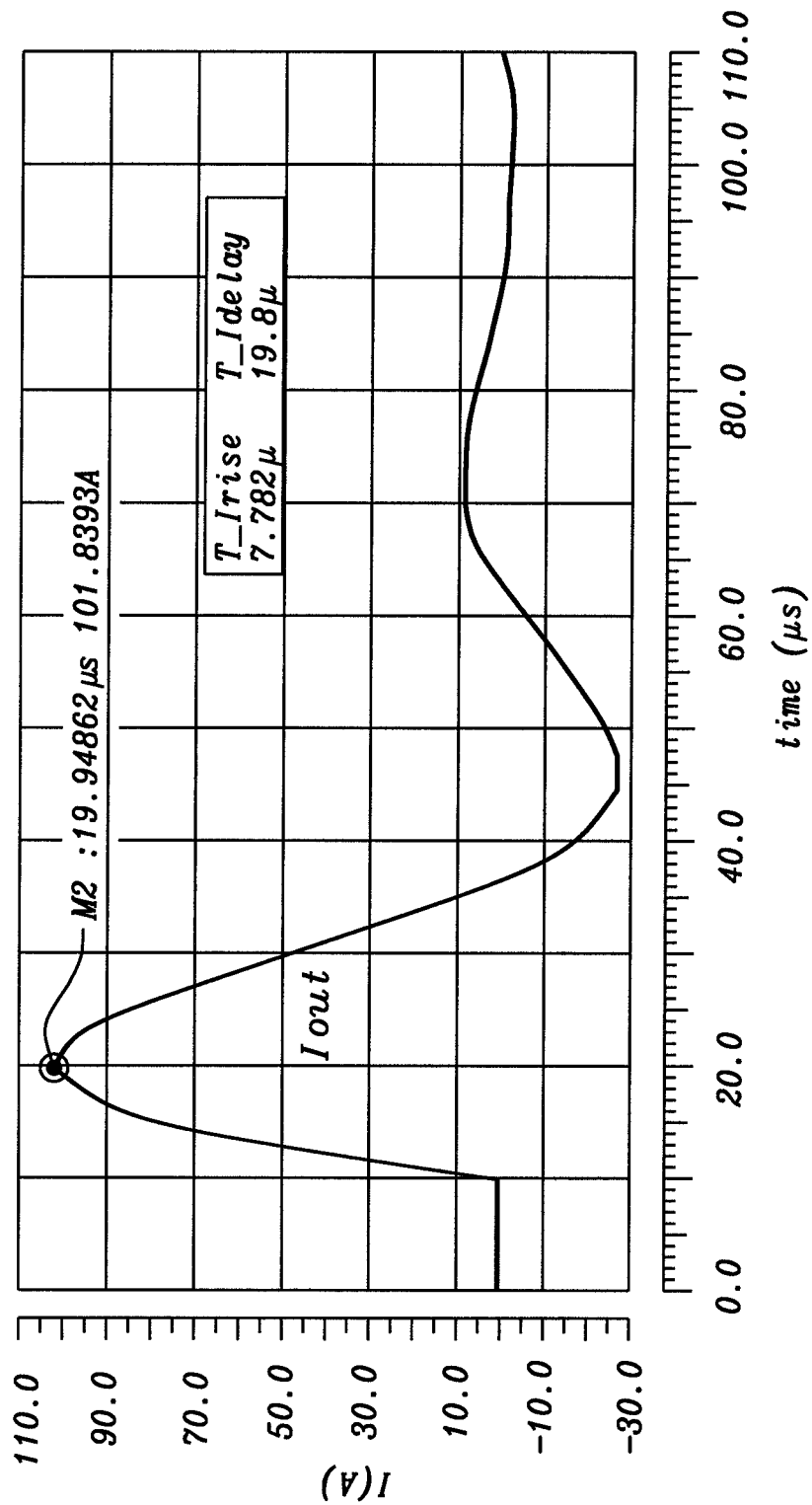
FIG. 10B is the simulation of the short circuit current waveform of the model of FIG. 8B.

FIGS. 10A and 10B are simulation results of the open circuit voltage waveform and the short circuit current waveform of the model of FIG. 8B, respectively. The surge generator model provides proper voltage and current waveforms to emulate IEC 61000-4-5 surge test.

Figure 11:
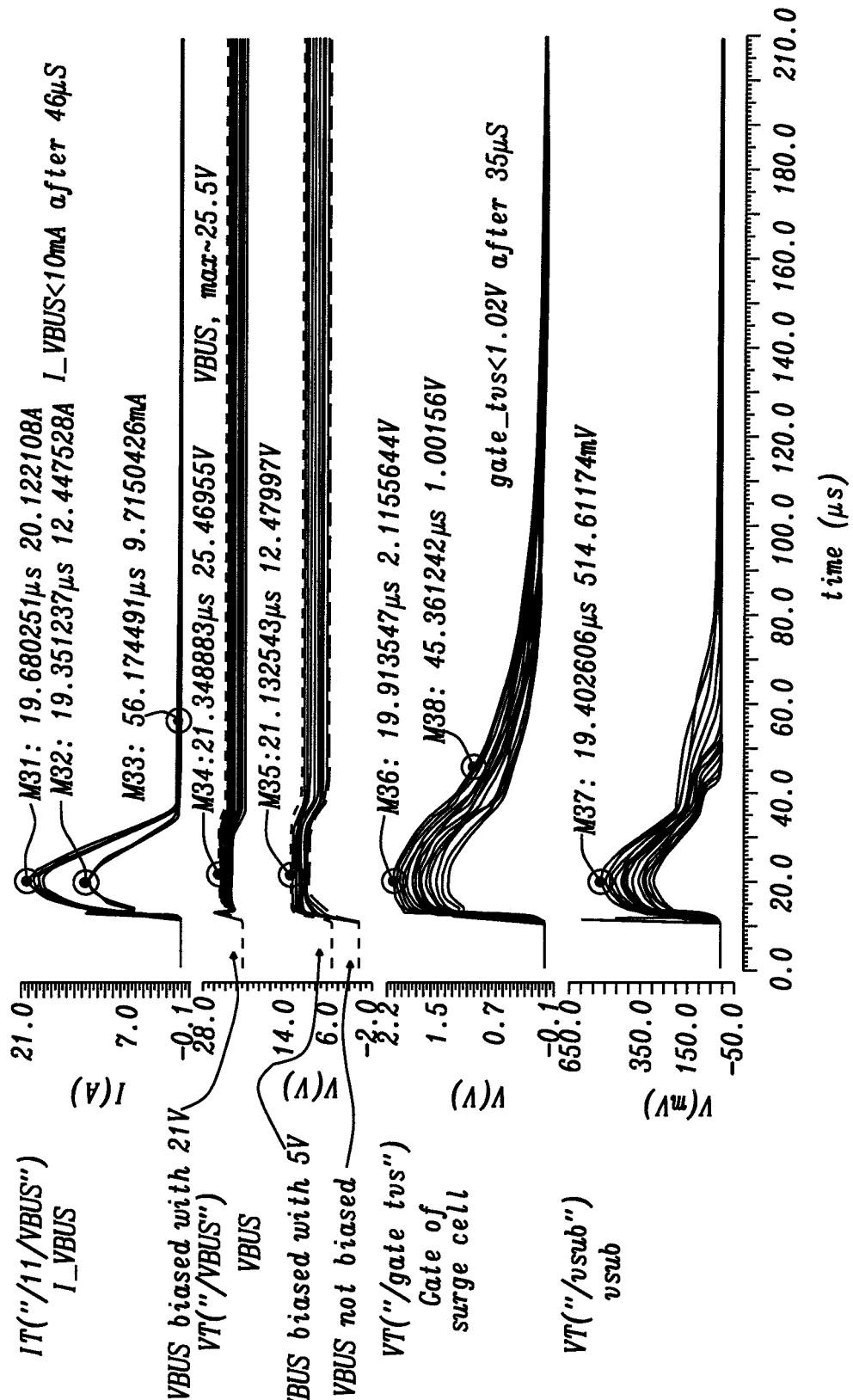
FIG. 11 is a plot of the simulations of the surge current I_VBUS, the voltage VBUS, the gate voltage of the surge cell gate_tvs, and the substrate voltage Vsub, obtained for a series of positive surges.

FIG. 11 illustrates the simulations of the surge current I_VBUS, the voltage VBUS, the gate voltage of the surge cell gate_tvs, and the substrate voltage Vsub, obtained for a series of positive surges. Simulations were obtained for VBUS being biased and non-biased and in each case for positive surge test with voltages of 200V, 150V, 100V and 50V, respectively.

Figure 12:
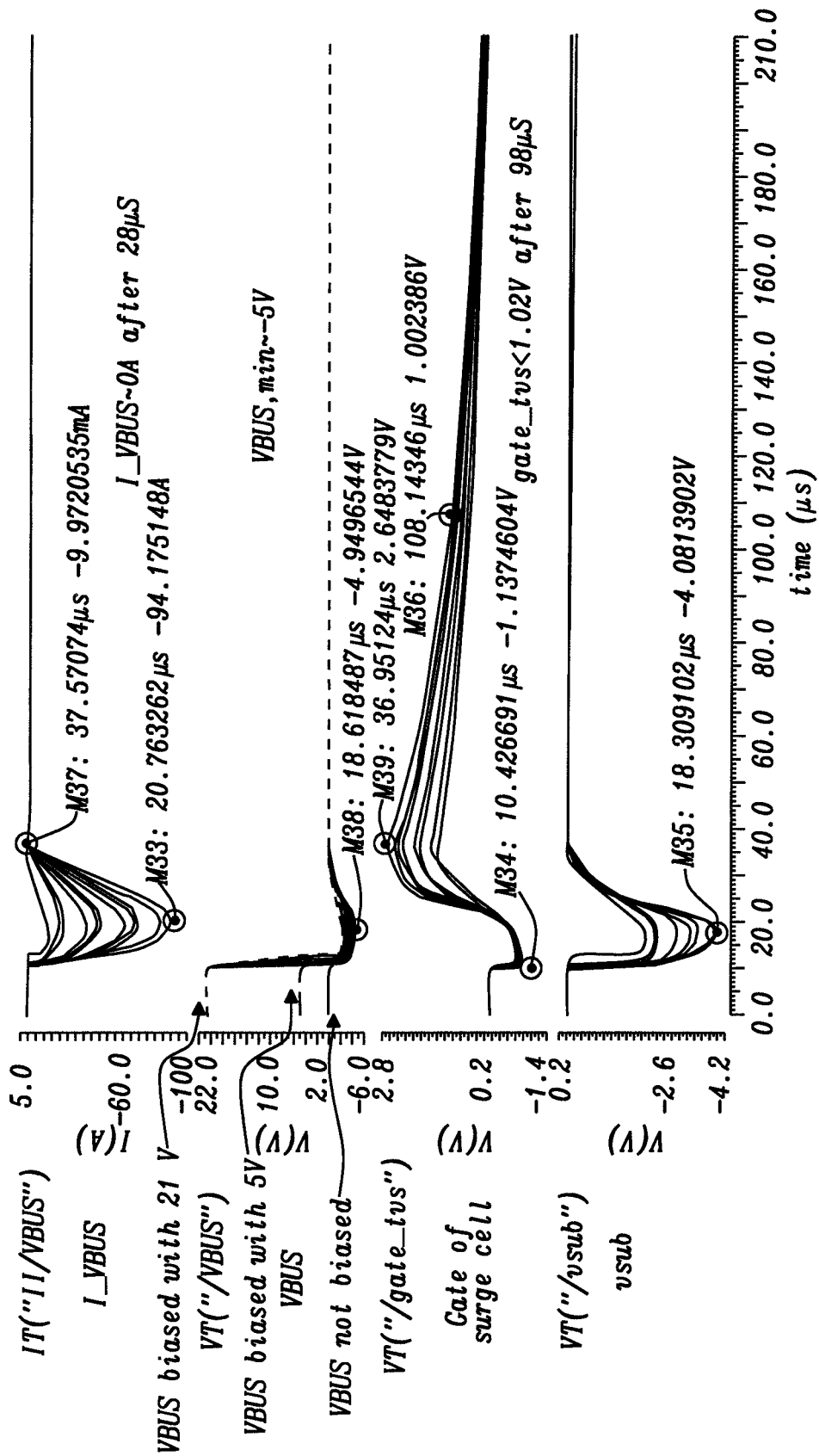
FIG. 12 is a plot of the simulations of the surge current I_VBUS, the voltage VBUS, the gate voltage of the surge cell gate_tvs, and the substrate voltage Vsub, obtained for a series of negative surges.

FIG. 12 illustrates the simulations of the surge current I_VBUS, the voltage VBUS, the gate voltage of the surge cell gate_tvs, and the substrate voltage Vsub, obtained for a series of negative surges. Simulations were obtained for VBUS being biased and non-biased and in each case for negative surge test with voltages of −200V, −150V, −100V and −50V, respectively.

The simulations shown in FIGS. 11 and 12 show that the circuit of the disclosure works well against ±200V surge test. The surge energy can be released to ground from VBUS against ±200V surge test.

Figure 13:
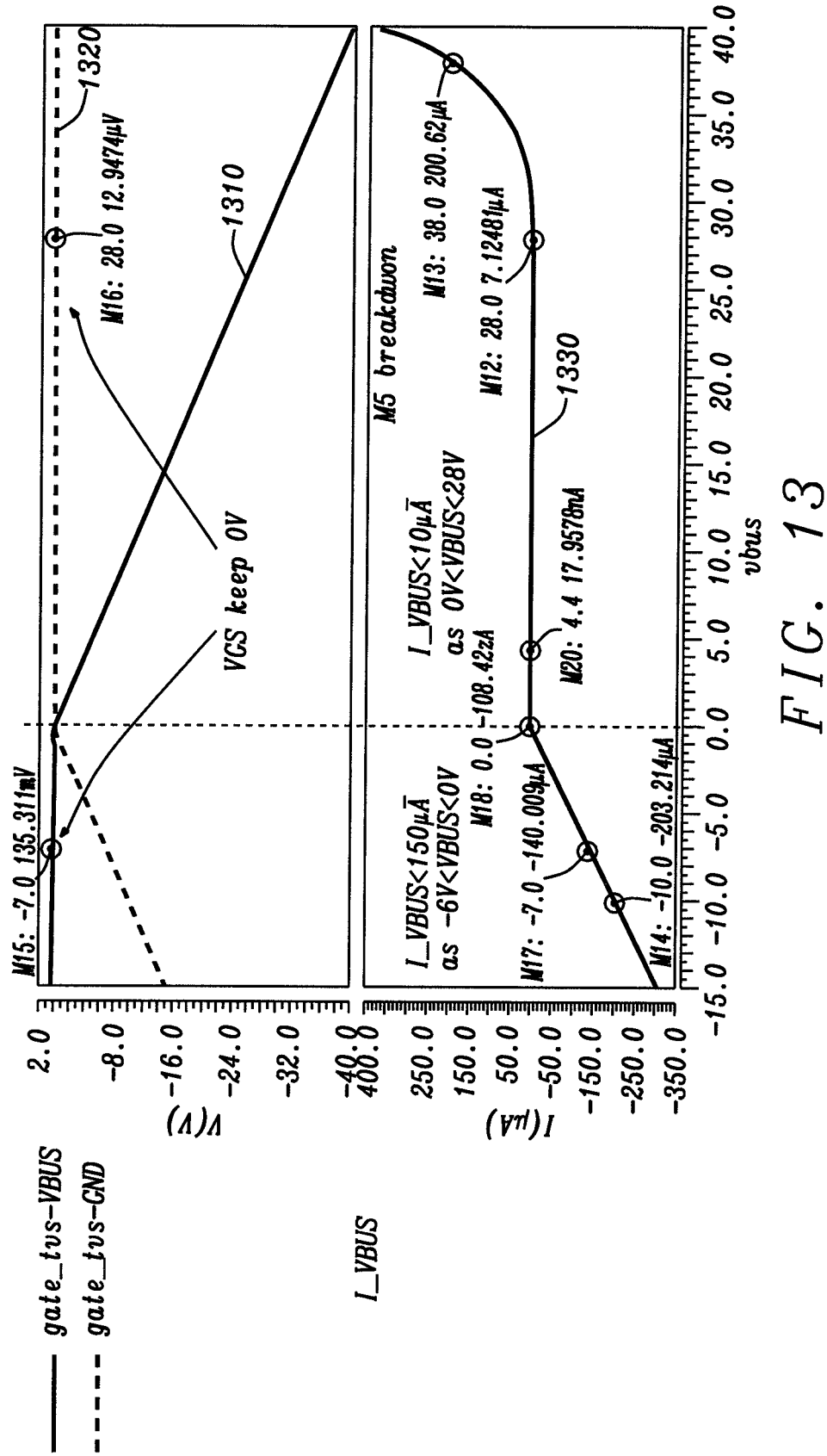
FIG. 13 is a simulation of the gate voltage of the surge cell gate_tvs and of the surge current I_VBUS obtained as a function of VBUS DC values.

FIG. 13 is a simulation of the gate voltage of the surge cell gate_tvs and of the surge current I_VBUS obtained as a functions of VBUS DC values. Trace 1310 shows Vgs (M5)=gate_tvs−VBUS, while trace 1320 shows Vgs (M6)=gate_tvs−ground. The trace 1330 shows the surge current through M5 and M6.

When VBUS is below zero, Vgs(M5)=0 and M5 is turned off. Similarly, when VBUS is above zero, Vgs (M6)=0 and M6 is turned off. Therefore at least one of M5 and M6 is turned off.

The specification of VBUS AMR was between −6V and +28V. The VBUS DC sweeping simulation results show that the circuit of the disclosure works well without large leakage as VBUS=−6V (DC) to ~+28V (DC). It is therefore possible to implement a surge immunity level of ±200V with VBUS AMR of −6V~28V.

The surge circuit of the disclosure as described with reference to FIGS. 2 to 13 may be used in many applications to prevent against damages due to voltage surges. For instance the circuit of the disclosure may be used as part of a connector such as a Universal Serial Bus (USB) connector.

Figure 14:
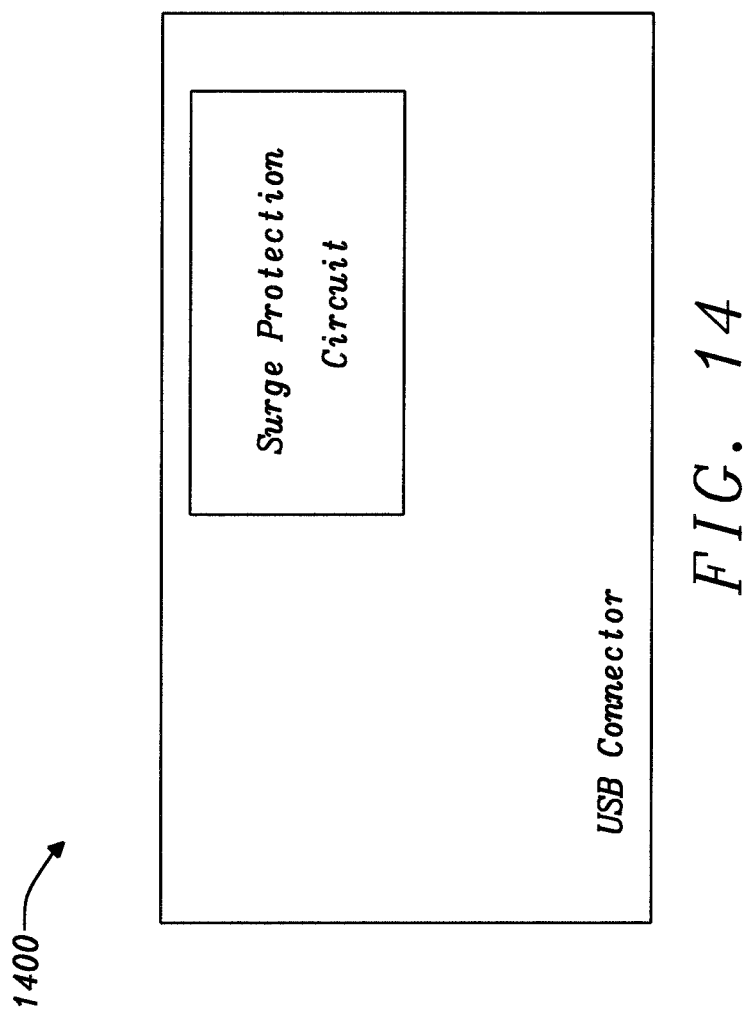
FIG. 14 is a schematic diagram of a USB connector provided with a surge protection circuit according to the disclosure.

FIG. 14 is a schematic diagram of a USB connector provided with a surge protection circuit according to the disclosure.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

What is claimed is:

1. A surge protection circuit comprising
an input port for receiving an input voltage;
an energy release cell having a first terminal coupled to the input port, a second terminal coupled to ground, and a control terminal coupled to the input port via a first switch device and to the ground via a second switch device;
the surge protection circuit being adapted to close the first switch device to enable a current to flow from the input port to ground through the energy release cell upon occurrence of a positive voltage surge and to close the second switch device to enable a current to flow from ground to the input port through the energy release cell upon occurrence of a negative voltage surge;
wherein the first switch device comprises a first switch coupled to a second switch, the first switch and the second switch having a common source node, and a common gate node, and wherein body diodes of the first switch and the second switch are connected back to back.

2. The surge protection circuit as claimed in claim 1, wherein the positive voltage surge occurs when the input voltage rises with a rising slew rate greater than a rising slew rate threshold or when the input voltage rises above a positive voltage threshold for a particular rising slew rate; and wherein the negative voltage surge occurs when the input voltage decreases with a falling slew rate greater than a falling slew rate threshold or when the input voltage decreases below a negative voltage threshold for a particular falling slew rate.

3. The surge protection circuit as claimed in claim 2, comprising
a first surge cell adapted to provide a first signal to close the first switch device upon occurrence of the positive voltage surge; and
a second surge cell adapted to provide a second signal to close the second switch device upon occurrence of the negative voltage surge.

4. The surge protection circuit as claimed in claim 1, wherein the first switch device comprises a first Zener diode coupled to the common source node and to a gate terminal of the first and second switches.

5. The surge protection circuit as claimed in claim 1, wherein the second switch device comprises a third switch coupled to a fourth switch.

6. The surge protection circuit as claimed in claim 5, wherein the fourth switch has a control terminal coupled to ground via a second Zener diode.

7. The surge protection circuit as claimed in claim 3, wherein the energy release cell comprises a fifth switch coupled to a sixth switch.

8. The surge protection circuit as claimed in claim 7, wherein the fifth switch and the sixth switch are power switches.

9. The surge protection circuit as claimed in claim 7, wherein the first surge cell comprises a first capacitor.

10. The surge protection circuit as claimed in claim 7, wherein the second surge cell comprises a second capacitor.

11. The surge protection circuit as claimed in claim 9, wherein the rising slew rate threshold and the positive voltage threshold are defined by the first capacitor and a size of the fifth switch.

12. The surge protection circuit as claimed in claim 10; wherein the falling slew rate threshold and the negative voltage threshold are defined by the second capacitor and a size of the sixth switch.

13. The surge protection circuit as claimed in claim 1, further comprising a biasing circuit coupled to the energy release cell, the biasing circuit being adapted to bias a substrate to the input voltage or to ground.

14. The surge protection circuit as claimed in claim 13, wherein the biasing circuit comprises a seventh switch coupled to an eighth switch; wherein the seventh switch has a control terminal coupled to ground and wherein the eighth switch has a control terminal coupled to the input port.

15. The surge protecting circuit as claimed in claim 14, wherein the seventh and eight switches have a common node coupled to the energy release cell.

16. A device comprising a surge protection circuit as claimed in claim 1.

17. A method of protecting against a surge, the method comprising
receiving an input voltage at an input port;
providing an energy release cell having a first terminal coupled to the input port, a second terminal coupled to ground, and a control terminal coupled to the input port via a first switch device and to the ground via a second switch device;
wherein the first switch device comprises a first switch coupled to a second switch, the first switch and the second switch having a common source node, and a common gate node, and wherein body diodes of the first switch and the second switch are connected back to back;
upon occurrence of a positive voltage surge, closing the first switch device to enable a current to flow from the input port to ground through the enemy release cell; and
upon occurrence of a negative voltage surge, closing the second switch device to enable a current to flow from ground to the input port through the energy release cell.

18. The method as claimed in claim 17, wherein the positive voltage surge occurs when the input voltage rises with a rising slew rate greater than a rising slew rate threshold or when the input voltage rises above a positive voltage threshold for a particular rising slew rate; and wherein the negative voltage surge occurs when the input voltage decreases with a falling slew rate greater than a falling slew rate threshold or when the input voltage decreases below a negative voltage threshold for a particular falling slew rate.

* * * * *

UNITED STATES PATENT AND TRADEMARK OFFICE
CERTIFICATE OF CORRECTION

PATENT NO. : 11,929,609 B2
APPLICATION NO. : 17/736306
DATED : March 12, 2024
INVENTOR(S) : Der-Ju Hung and Yuan Wen Hsiao Page 1 of 1

It is certified that error appears in the above-identified patent and that said Letters Patent is hereby corrected as shown below:

In the Claims

In Column 10, Line 52, Claim 17 please change "enemy" to "energy".

Signed and Sealed this
First Day of April, 2025

Coke Morgan Stewart
*Acting Director of the United States Patent and Trademark Office*